Sept. 4, 1956 A. C. BERNSTEIN Re. 24,209

NEUTRAL RELAY

Original Filed July 19, 1952 2 Sheets-Sheet 1

INVENTOR.
ALLAN C. BERNSTEIN

BY

Ostrolenk & Faber

ATTORNEYS

Sept. 4, 1956 A. C. BERNSTEIN Re. 24,209

NEUTRAL RELAY

Original Filed July 19, 1952 2 Sheets-Sheet 2

INVENTOR.
ALLAN C. BERNSTEIN

BY

Ostrolenk & Faber

ATTORNEYS

United States Patent Office

Re. 24,209

Reissued Sept. 4, 1956

24,209

NEUTRAL RELAY

Allan C. Bernstein, Kings Point, N. Y., assignor of one-third to Nathaniel A. Karr and one-third to Philip H. Seaman Original No. 2,702,841, dated February 22, 1955, Serial No. 299,879, July 19, 1952. Application for reissue February 29, 1956, Serial No. 568,694

3 Claims. (Cl. 317—172)

Matter enclosed in heavy brackets [ ] appears in the original patent but forms no part of this reissue specification; matter printed in italics indicates the additions made by reissue.

My present invention relates to electro-magnetic relays and more particularly it relates to magnetically biased neutral relays.

In the past neutral relays have been constructed having a generally fixed magnetic path, very often U-shaped, a movable armature of magnetic material rotatable about a pivot point and having two positions, an open position away from the stationary electro-magnet and a closed position when engaging the stationary magnet.

The armature is usually held in its normally open position by means of a spring against a back stop. An energizing coil is wound on the stationary electro-magnet to generate in the magnetic path the necessary flux. In this open position, an air gap exists between one end of the armature and the corresponding end of the stationary magnet. As the current in the energizing coil is increased, the magnetic pull on the armature by the stationary electro-magnet increases and moves the armature against the bias of the spring toward the stationary magnet.

In order to move the armature from its normally open position, the magnetic flux has to produce a sufficiently large magnetic pull to overcome the torque produced by the biasing spring.

As the armature moves, the air gap between the armature and stationary magnet decreases causing a decrease in the reluctance of the magnetic path consisting of the stationary magnet and movable armature and a corresponding increase in the magnetic flux.

This effect is then cumulative and once moved the armature will continue to move until stopped at its closed position by means of another stop or against the structure of the stationary electro-magnet.

The motion of the armature in this relay has been used mainly to operate contacts and to achieve desired switching actions. The main shortcoming in this type of relay is the fact that as the armature moves, the biasing spring which tends to maintain the armature in the open position of the relay extends, thus increasing the biasing force applied to the armature.

The biasing force produced by the spring would then be a maximum when the armature is in the closed position of the electro-magnetic relay. In other words, the biasing torque is greater when the armature is in the closed position than when the armature is in the open position.

Furthermore, it means that the magnetic force created by the energizing coil in the relay must perform not only the useful work of creating contact pressure on the normally open contacts of the relay but must also overcome the restoring torque created by the extended biasing spring.

The obvious modification to partially overcome this problem is to decrease the torque created by the biasing spring; but decreasing the torque of the spring means making it much weaker and lessens the available contact pressure on the back contacts of the relay at the normally open position of the relay.

In other words, by decreasing the torque of the biasing spring, contact pressure on the front contacts of the relay is increased at the expense of the contact pressure on the back contacts of the relay.

There are other similar means for arriving at such relays, but they are complex and expensive.

My present invention overcomes this problem by using magnetic biasing means in place of the mechanical biasing means such as a spring.

The magnetic biasing means used in my invention is a permanent magnet which tends to maintain the armature of the relay in one of its two positions. When the core of the relay is energized by means of an energizing coil and as soon as the pulling force of the electro-magnetic part of the relay exceeds that produced by the permanent magnet, the armature of the relay will move from the first-mentioned position to a second position in which it leaves the permanent magnet and is attracted toward the electro-magnet.

As the armature moves from the first to the second position, two changes occur:

(1) The previously large air gap between the armature and the electro-magnet decreases, thus producing a cumulative effect to substantially drive the armature with a snap action against the pole face of the electro-magnet.

(2) The air gap between the armature and the permanent magnet increases during such motion of the armature, thus increasing the reluctance of the magnetic path for the flux generated by the permanent magnet. This effect is also cumulative and as soon as this air gap starts increasing, the armature will not be any longer biased toward the permanent magnet.

It is seen from the above that the energizing coil of my novel electro-magnet will have to perform only the work necessary to overcome the torque of the permanent magnet and once that is overcome to create the necessary pressure on the front contacts. The necessary pressure on the back contacts is, on the other hand, assured by the biasing action of the permanent magnet. This obviously permits a more sensitive construction from the viewpoint of energy required in the coil to achieve good contact pressure.

The main object of my present invention is, therefore, a relay structure wherein substantially all the work of the energizing coil in the normally closed position is directed toward creating the desired pressure on the front contacts.

In conventional relays the motion of the armature toward the operated position occurs against increasing torque produced by the biasing or resetting spring so that during the travel of the armature, a relatively small amount of mechanical work may be performed by the armature.

As is well-known in the art, the armature of a relay is very often required to perform considerable work during its travel from one position to the other position. For example, the armature may be used to actuate mechanical devices.

In my novel relay, the motion of the armature toward the operated position occurs instead against decreasing torque produced by the permanent magnet in opposition to the flux produced by the energizing current so that more mechanical work may be performed, where required, by novel relay for a fixed energization or number of ampere turns.

Accordingly, another object of my present invention is a relay capable of producing a relatively large amount of useful mechanical work for a fixed energization or number of ampere turns.

More specifically, as soon as the magnetic pulling force due to the energizing current becomes greater than the magnetic pulling force due to the permanent magnet minus the neutralizing force caused by the energizing current, the armature starts its travel from non-operated to operated position. At the beginning of this travel, the air gap at the permanent magnet side increases while the air gap at the energizing side decreases. As is well-known in the art, when such conditions exist, a cumulative effect will take place such that without need for further increasing the energizing current, the armature will now move from the non-operated to the operated position. This action will occur in a very short interval of time and the armature will go from the first to the second position in what is known in the art as "snap action."

Another object of my present invention is, therefore, a snap action relay.

The snap action is further enhanced by my novel relay in that while a spring as it is stretched or contracted presents a certain amount of time delay to the stimulus or, in other words, a certain inertia, my novel relay is free of this source of time delay.

More specifically, while in previous relays the armature may decelerate as it moves toward its operated position because of the increasing biasing force, in my novel invention, the armature will always accelerate as it moves from non-operated to operated position.

My novel relay is provided essentially with two preferably U-shaped pieces of soft iron connected to each other at one of their legs to form an E-shaped structure and preferably separated by a piece of non-magnetic material at the junction. This E-shaped structure may be formed in other ways and materials other than soft iron may be used. A permanent magnet is securedly mounted on one of the outer legs of this E-shaped structure and the armature is pivoted at the center leg and in its normal position is angularly displaced in the direction of the permanent magnet.

This permanent magnet may be placed anywhere in the magnetic circuit except in the center leg. Alternate positions include any portion of the armature between pivot point and the outer leg and any portion of the U-shaped piece between the center leg and the outer end of the magnetic path which attracts the armature. Furthermore, the permanent magnet may be replaced by an electro-magnet.

An energizing coil surrounds the center leg of this E-shaped structure. When this coil is not energized, the relay armature will as previously mentioned be positioned toward the biasing magnet by virtue of the magnetic forces exerted by this magnet, while an air gap will exist between the other end of this armature and the other outer leg of the E-shaped structure.

It is here necessary to point out that the armature will be positioned toward the biasing magnet if the various air gaps and the magnetic structure are properly portioned. In fact, the permanent magnet produces a flux which may be considered to flow through two magnetic circuits, one magnetic circuit consisting of the whole armature, the outer legs of the E-shaped core and the bridging leg of the E-shaped core.

The second magnetic path consists of the one leg of the E-shaped core on which the permanent magnet is positioned, the center leg of the E-shaped structure and that portion of the E-shaped structure that is positioned between that center leg and the above-mentioned outer leg in conjunction with a portion of the armature.

In order that my relay be operative without manual resetting, it is necessary that the second of these two magnetic circuits have a much lower reluctance than the first one in any possible position of the armature with no current flowing through the coil.

By this means the armature will actually be attracted toward the next operative position by the biasing magnet when the main coil is not energized.

The problem of making the second magnetic circuit a low reluctance one may be solved as previously mentioned by proportioning the magnetic structures in a manner well-known in the art.

It is known that, after the relay has been operated by energizing the coil, if the reluctance of the first path is less than the reluctance of the second path, after the coil is deenergized, the armature will not return to its normal non-operated position and thereby will be locked up in the operated position.

The permanent magnet need exert only enough force to return the armature from the operated to the non-operated position and if back contacts are used, to allow the armature to engage the back contacts with the desired contact pressure when the coil is de-energized. Of course, the useful force exerted by the permanent magnet will be a function of the magnetic structure described above, and the selection of such a permanent magnet will, therefore, be influenced by the reluctance of the two magnetic circuits.

If sufficient D. C. current is applied to the energizing coil in such a direction that the magnetic flux set up in the E-shaped electro-magnet tends to neutralize the magnetic field set up by the permanent magnet, the armature will move from the first-mentioned position to a second position. Actually, while flux is generated by the energizing coil to overcome or neutralize the flux of the permanent magnet, a second magnetic path is simultaneously energized by the coil including the other U-shaped member of the E-shaped structure. This U-shaped member tends to pull toward itself the armature of the relay.

To summarize the above, as the current in the energizing coil is increased in the proper direction, two things happen at the same time. A flux is produced to partially or completely cancel the flux of the permanent magnet and a flux is produced to attract the armature toward the leg of the electro-magnet away from the permanent magnet.

Once the armature is positioned in this second position, a further increase of current flow through the coil will have no bearing on the action of the relay except to increase the pressure on the first contacts. It is further apparent that once the relay is operated, the forces tending to restore it to its normal position with a minimum air gap are very small because of the size of the air gap above the permanent magnet, and most of the force created by the energizing coil can be usefully used to create contact pressure at the contacts corresponding to the closed relay since very little of this force in the closed position is required to overcome the pull of the permanent magnet.

The armature of a relay may be provided, for example, with contacts which serve as shorting bars for shorting circuits mounted stationarily with respect to the core of the relay.

In my novel relay the techniques of the so-called printed circuits may be used to construct a novel stationary contact structure and a movable contact structure.

In the above example all of the contacts are arranged in a printed circuit on a piece of plastic or other suitable material. If stationary or stator contacts are desired it is possible to use prepared stock consisting of a copper plate laminated to a piece of Bakelite and photo-engraving techniques to etch all of the copper away except that portion which is desired for the printed circuit or, in other words, the stator contact circuit.

The remaining copper on the Bakelite plate can then subsequently be plated with a suitable current carrying and corrosion resistant metal such as silver or gold to provide low contact resistance, long life and no corrosion.

The shorting bars constituting the rotor contacts may similarly be printed circuit shorting bars prepared in the same way and the rotor may be attached to the armature of my relay by cementing or other suitable means so that motion of the armature causes corresponding motion of the rotor.

Both stator and rotor contacts have the following advantages over the previously used ones, namely, low cost, inherent sensitivity especially in the case of multi-contact arrangements, ease of manufacture to readily attainable tolerances which permit assembly with little manual adjustment during the assembly operations, small size and combined with the general structure described tend to give a well balanced mechanical design inherently resistant to shock.

While a simple make-break set of contacts is illustrated, much more complex structures may be used, and while only one of several "printed-circuit" techniques has been described, there are others, well-known in the art which might be used.

Accordingly, another object of my present invention is a contact structure mechanically sensitive and easy to manufacture having also a small size and inherently resistant to shock.

Obviously such contact construction while particularly adaptable is not limited to relays of the kind described above but may be used in any structure having stationary and movable contacts and it is particularly efficient whenever the number of contacts is relatively large, certainly more than a pair.

While this construction is particularly adapted for relatively low current carrying requirements, by proper preparation of the structure, it is possible to use it at currents up to several amperes.

The contact carrying insulating plate can flex slightly to provide a desirable wipe action on the contacts to lessen tolerance problems in manufacture and to speed the action of the relay.

It will be noted that the armature structure used in my novel relay is balanced to give uniform operating characteristics independent of gravity, that is, in any position of the armature.

Accordingly, another object of my present invention is a relay having uniform operating characteristics.

Furthermore, with certain proportions to the magnetic structure, even though current is induced in the coil in the direction to aid the flux of the permanent magnet, at some value of current where the coil flux is large compared to the permanent magnet flux, the armature will move from the non-operated to the operated position. This may have application as a relay operating on a small current in one direction and a large current in the other direction.

Another object of my present invention is, therefore, a relay operating on a small current flowing in one direction and operating on a larger current in the opposite direction.

The foregoing and many other objects of my invention will become apparent in the following description and drawings in which.

Figure 1:
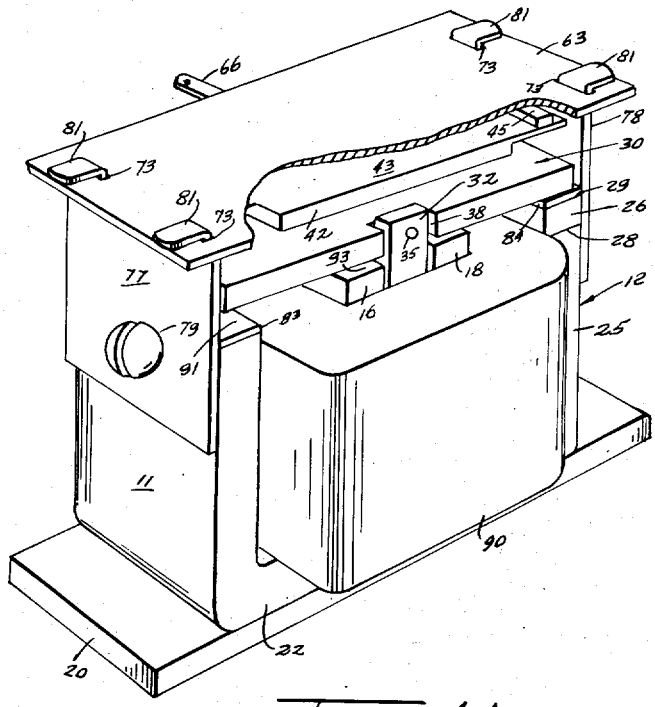
Figure 1 is a perspective view of one embodiment of my novel relay.
Figure 1A:
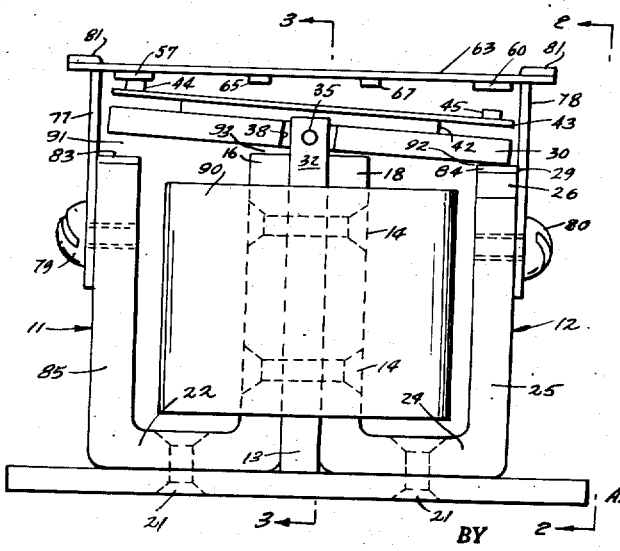
Figure 1A is a front view of my novel relay.

Referring first to Figures 1 and 1A, the U-shaped cores

11 and 12 of soft iron or other suitable magnetic material forming the magnetic structure of my novel relay are separated by a bar 13 of brass or other non-magnetic material and secured to each other, side by side, by means of rivets 14 or in any other suitable way. Rivets 14 engage leg 16 of core 11, leg 18 of core 12, and the separating member 13.

The assembly 11—12 is further secured to a base 20 by means of rivets 21 engaging portion 22 of core 11 and portion 24 of core 12 and base 20.

One leg 25 of core 12 is shorter than the other leg 18 and mounted on it is a permanent magnet 26. Magnet 26 is fastened to the top of outer leg 25 of core 12 by brazing, soldering or other suitable means and is so polarized that one magnetic pole 28 is at the lower end of magnet 26 adjacent to the top of leg 25 of core 12, while the other 29 is at the upper end of magnet 26 adjacent the moving armature 30.

Figure 5:
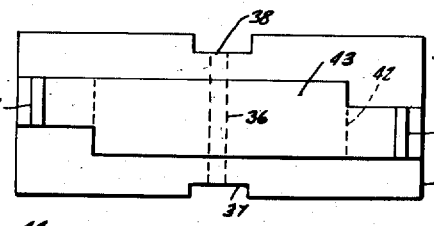
Figure 5 is a top view of the armature and moving contact structure of my novel relay.
Figure 6:
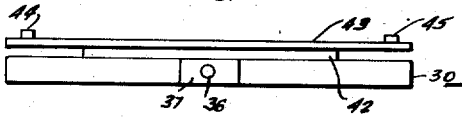
Figure 6 is a side view of the armature and moving contact structure of my novel relay.

Non-magnetic member 13 ends upwardly with two extending arms 32 and 33 (see also Figure 3) which support armature 30 by means of a pin 35 driven through arms 32 and 33 and center portion 36 of armature 30. Center portion 36 (see also Figures 3, 5 and 6) of armature 30 is slightly recessed as at 37 and 38 to permit engagement of center portion 36 by arms 32 and 33 of non-magnetic member 13.

Figure 7:
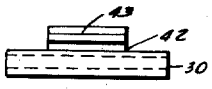
Figure 7 is an end view of the armature and moving contact structure of my novel relay.

A separator of insulating material 42 is fastened to the top surface of armature 30 (see also Figures 5, 6, and 7) and a second piece of insulating material 43 is secured to the top of separator 42. Two moving contacts 44 and 45 are attached to the top of insulating member 43.

Movable contact structure 43—44—45 may be made in any known manner or by printed circuit technique as hereinafter described.

Movable contacts 44 and 45 serve to short circuit stationary contacts 57, 58 and 59, 60, respectively, mounted on the stationary contact plate 62.

Stationary contact plate 62 (see also Figure 8) may be prepared in any conventional way or by printed circuit technique as described hereinafter and consists of a board of insulating material 63 on which are mounted in any suitable way stationary contacts 57, 58, 59 and 60 connected to terminals 65, 66 and 67 by strips 70, 71 and 72 of copper or other suitable material.

More specifically, contacts 57 and 59 are connected by means of copper strip 71 to terminal 65, contact 58 to terminal 66 by strip 70, and contact 60 to terminal 67 through strip 72.

Plate 63 is also provided with openings as at 73 for a purpose described hereinafter.

Stationary contact structure 62 is mounted on the cores 11 and 12 by means of supporting plates 77 and 78 which are fastened on the sides of U-shaped cores 11 and 12 by screws 79 and 80, respectively, or any other appropriate means.

Figure 2:
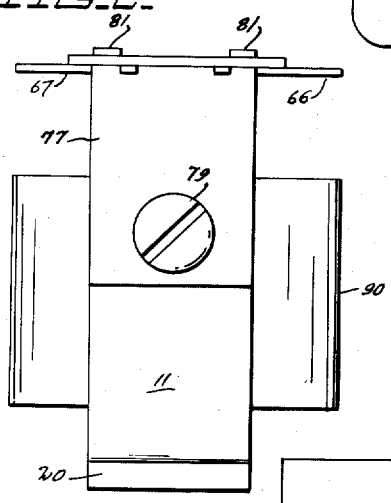
Figure 2 is a side view of my novel relay.

The supporting plates 77 and 78 are provided in their upper portion with extensions 81 which engage the openings 73 of stationary contact structure 62 (see also Figure 2).

Figure 4:
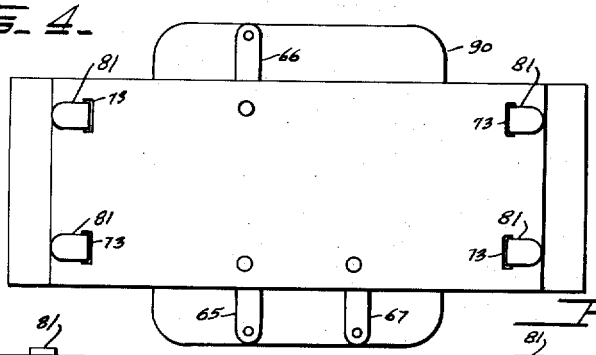
Figure 4 is a top view of my novel relay.

Contact structure 62 is, therefore, fastened to the relay assembly by inserting the four extensions or dog ears 81 of plates 77 and 78 through holes 73 of structure 62 and then bending the dog ears, for example, outwardly (see Figure 4).

Fixed air gaps between armature 30 and cores 11 and 12 are provided by shims 83, 84 of non-magnetic material fastened in any suitable way on the top surface of leg 85 of core 11 and the top surface of permanent magnet 26 on the top of core 12.

The relay assembly is adjusted by loosening screws 79 and 80 and positioning supporting plates 77 and 78 so that in the non-operated position when the armature 30 is touching shim 84 moving contact 44 is shorting fixed contacts 57 and 58 with sufficient pressure to slightly deflect the portion of insulating plate 43 which overhangs the separator 42 and create the desired pressure on the closed contacts.

The adjustments must be such that in the operated position when armature 30 rests on shim 83, moving contact 45 shorts fixed contacts 59 and 60 with sufficient pressure to cause slight deflection in the portion of insulating plate 43 which overhangs separator 42 and, as mentioned above, to create the desired pressure on the closed contacts.

Figure 3:
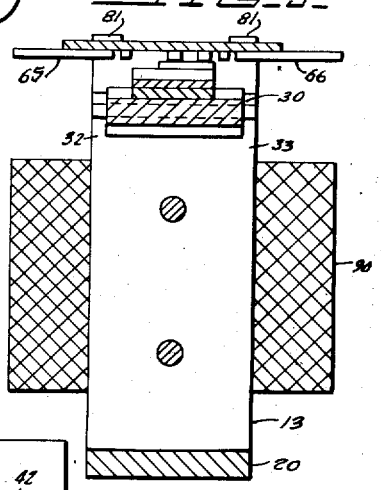
Figure 3 is a cross-sectional view taken at line 3—3 of Figure 1A looking in the direction of the arrows.

The energizing coil 90 is positioned over the center leg 16—18—32 of the now E-shaped assembly 11, 12, 32 as shown in Figures 1 and 3.

The operation of my novel relay may now be understood. Assuming first (Figure 1) that no current flows in coil 90, the only source of magnetic flux will be the permanent magnet 26. Permanent magnet 26, therefore, attracts armature 30 and maintains it in the position shown in Figure 1.

If a D. C. current of the correct polarity is now made to flow in energizing coil 90, a second flux will be generated.

Because of the choice in the polarity of the D. C. energizing current flowing in coil 90, this second flux will flow in the magnetic circuit consisting of core 12 and armature 30 in a direction opposite to the direction of flow of the flux produced by the permanent magnet 26.

As soon as current flowing in the energizing coil 90 reaches a certain value determined by the magnetization of permanent magnet 26, two effects will occur simultaneously:

(1) The flux flowing in the core 12 produced by the D. C. current flowing in coil 90 neutralizes partially the flux produced by the permanent magnet 26.

(2) The energizing current flowing through coil 90 also produces a flux in core 11 which produces on the top surface of its leg 85 a magnetic pulling force which is slightly larger than the resisting force of the partially cancelled magnetic flux from the permanent magnet and which will cause armature 30 to move from the position shown in Figure 1 to a second position in which the movable contacts 44 open the circuit between stationary contacts 57 and 58 and the end of armature 30 carrying movable contact 44 rests against the shim 83 on the top surface of leg 85.

More specifically, as the energizing current flowing in coil 90 increases, the pulling force exercised by permanent magnet 26 decreases continuously while the pulling force exercised by core 11 at its leg 85 on armature 30 increases continuously until a point is reached when the magnetic pulling force produced by core 11 is stronger than the pulling force difference between the positive pulling force of the permanent magnet 26 and the negative pulling force of core 12.

At this point armature 30 will begin rotating around its pivot 35, decreasing the air gap 91 and at the same time increasing air gap 92. As air gap 91 decreases, the force due to the flux in the magnetic path consisting of armature 30 and core 11 increases cumulatively while the force due to the flux in the circuit consisting of core 12, permanent magnet 26 and armature 30 will decrease cumulatively because of the respective decrease and increase in magnetic reluctance in the two circuits.

This action terminates when armature 30 moves from the position shown in Figure 1 to its second position in which as previously mentioned air gap 91 is reduced to the shim 83 and movable contact 44 opens the circuit between stationary contacts 57 and 58. Actually, there is always a small air gap 93 at the top of the center leg structure 16—18 of core 11—12.

It is seen from the above that the operation of my novel relay is, therefore, possible without the use of any retaining or resetting springs so that most of the magnetic force produced by the energizing current flowing in coil 90 may be used to perform useful work, for example, to move other mechanical apparatus like the tripping devices of circuit breakers.

It is further seen that when my novel relay is in its operative position, permanent magnet 26 does not exert any appreciable force on armature 30 so that most of the flux produced at leg 85 of core 11 by current flowing in coil 90 is used to maintain the desired contact pressure between movable contact 45 and stationary contacts 59 and 60. The same, of course, is true when my novel relay is in its non-operated position, in which case the permanent magnet 26 serves to provide sufficient contact pressure to provide good contact engagement between movable contact 44 and stationary contacts 57 and 58.

It will further be seen that my novel relay will operate almost instantaneously since it does not use any spring which as is well-known always causes a certain amount of delay due to its inertia, as it is moved from, for example, a non-operated position in an operated position, in other words, from a released position to a tensed position.

The stationary contact structure 62 and the movable contact assembly 43—44—45 may be made in addition to the well-known methods of production by means of printed circuit techniques which have several advantages with respect to the conventional method used in the art.

The stationary contact structure 62 which from now on will be called the stator may be prepared using printed circuit techniques by using prepared stock consisting of insulating plates laminated with copper plate laminations or other suitable conductive laminations.

Figure 8:
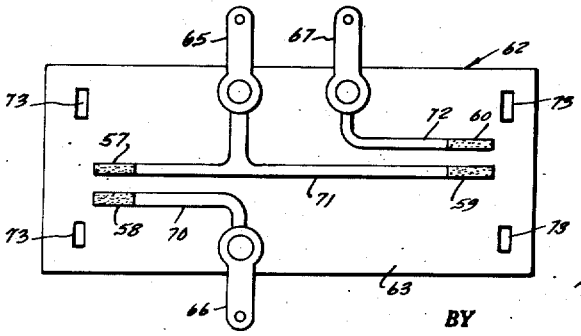
Figure 8 is a bottom view of the fixed contact structure of my novel relay.

This stock may be seen from Figure 8 by imagining that the copper strips 70, 71 and 72 occupy all the surface of the insulating plate 63. A stock of that shape may then be processed using photo-engaging techniques to etch out all the copper except that which is desired for the printed circuit, in this case the strips 70, 71 and 72. These strips may later be plated with precious metals like silver or gold to increase their conductivity as, for example, at the contacts 57, 58, 59 and 60.

This further plating ensures not only better conductivity but also provides protection against corrosion of the so plated copper.

Similarly, the movable contact structure consisting of contacts 44 and 45 on the insulating plate 43 may be made by printed circuit techniques where copper is laminated to one side of the piece of laminated Bakelite. The copper is then etched away completely from one side, except where contacts 44 and 45 are desired. These contacts may later be plated with silver, gold, or other suitable contact material to provide a low resistance contact and sufficient protection against corrosion.

Obviously this method for making contact structure is not limited to contact structure of relays but may be used for any other type of contact structure.

Furthermore, while the contact structure of my novel relay is preferably made by the above printed circuit techniques, it is necessary to point out that these contact structures may also be made in any suitable conventional way.

Although this contact structure construction is particularly adapted for relatively low current carrying requirements, by proper proportioning, currents up to several amperes can be successfully carried.

In the foregoing I have described my invention solely in connection with specific embodiments thereof. Since many variations and modifications of my invention will now be obvious to those skilled in the art, I prefer to be bound not by the specific disclosures herein contained but only by the appended claims.

I claim:

1. In a neutral relay having an E-shaped magnet including *an armature*, a first magnetic circuit comprising [the middle and] *a first and second* outer leg of said E-shaped magnet *and substantially the entire armature*, and a second magnetic circuit comprising [the other outer leg of said E-shaped magnet and said middle leg] *the second outer leg and the middle leg of said E-shaped magnet and that portion of the armature between said second and*

*middle legs,* [an] *said* armature *being* pivotally mounted adjacent said middle leg of said E-shaped magnet and operable to a first position [against] *toward* said first [mentioned] outer leg by *magnetic* energization of said first [magnetic circuit] *outer leg* and operable to a second position [against] *toward* [the] *said* second [mentioned] outer leg by *magnetic* energization of said second magnetic circuit, a permanent magnet [in] *associated with* said second magnetic circuit to normally bias said armature to its second position *upon sufficient de-energization of said first outer leg,* and an energizable winding [in] *controlling magnetic energization of* said first [magnetic circuit] *outer leg and* operable when energized for sufficiently neutralizing said permanent magnet and sufficiently energizing said first [magnetic circuit] *outer leg* to operate said armature to its first position, said second magnetic circuit having a lower reluctance than said first magnetic circuit to render said permanent magnet operative, when said energizable winding is sufficiently de-energized, to operate said armature from its first to its second position.

2. In a neutral relay having an E-shaped magnet including *an armature spanning substantially between the first and second outer legs,* a first magnetic circuit comprising [the middle and] *a first and second* outer leg of said E-shaped magnet *and substantially the entire armature,* [and] a second magnetic circuit comprising [the other outer leg of said E-shaped magnet and said middle leg] *the second outer leg and the middle leg of said E-shaped magnet and that portion of the armature between said second and middle legs, and a third magnetic circuit comprising the first outer leg and said middle leg and that portion of the armature between said first outer leg and said middle leg,* [an] *said* armature *being* pivotally mounted adjacent said middle leg of said E-shaped magnet and operable to a first position [against] *toward* said first mentioned outer leg by energization of said [first] *third* magnetic circuit and operable to a second position [against the] *toward said* second mentioned outer leg by energization of said second magnetic circuit, a permanent magnet in said second magnetic circuit to normally bias said armature to its second position *upon sufficient de-energization of said third magnetic circuit,* and an energizable winding [in] *controlling* said [first] *third* magnetic circuit *and* operable when energized for sufficiently neutralizing said permanent magnet and sufficiently energizing said *third* magnetic circuit to operate said armature to its first position, said second magnetic circuit having a lower reluctance than said first magnetic circuit to render said permanent magnet operative when said energizable winding is sufficiently de-energized to operate said armature from its first to its second position.

3. In a neutral relay having a first and second loop magnetic circuit comprising an E-shaped core [consisting of] *having a* middle [and outer leg] *and a first and second outer leg* [of said E-shaped magnet for the first magnetic circuit and consisting of the other outer leg of said E-shaped magnet and said middle leg for the second magnetic circuit and an armature, a portion of said armature forming, with a portion of said E-shaped core one of said loops, the other portion of said armature forming with the second portion of said E-shaped core the second loop of lower reluctance than said first loop, the center leg of said E-shaped core being common to both loops, said] *an* armature [being] pivotally mounted adjacent said middle leg [of said E-shaped magnet] and operable to a first position [against] adjacent said first [mentioned] outer leg by *magnetic* energization of said first [loop] *outer leg* and operable to a second position [against] *adjacent* [the] *said* second [mentioned] outer leg by *magnetic* energization of said second [loop] *outer leg, substantially said entire armature forming with said first and second outer legs a first loop magnetic circuit, a portion of said armature forming with said middle and second outer legs a second loop magnetic circuit, being of lower reluctance than said first loop magnetic circuit at any position of said armature,* a permanent magnet [in said] *positioned for the magnetic energization of said* second loop for normally biasing said armature to its second position, and means on said *middle leg* [common portion of said two loops] for sufficiently neutralizing *the flux of* said permanent magnet *in said second loop* and sufficiently energizing said first [loop] *leg* to operate said armature to its first position, said permanent magnet becoming operative when said last *mentioned* means is sufficiently de-energized to operate said armature from its first to its second position.

References Cited in the file of this patent or the original patent

UNITED STATES PATENTS

| | | |
|---|---|---|
| 799,016 | Schwarze | Sept. 5, 1905 |
| 1,525,697 | Stoekle | Feb. 10, 1925 |
| 1,562,646 | Kaisling | Nov. 24, 1925 |
| 1,901,443 | Garvin | Mar. 14, 1933 |
| 2,066,511 | Arlt | Jan. 5, 1937 |
| 2,203,888 | Ashworth | June 11, 1940 |
| 2,229,585 | Osenberg | Jan. 21, 1941 |
| 2,344,809 | Eaton | Mar. 21, 1944 |
| 2,380,293 | Carroll | July 10, 1945 |
| 2,616,994 | Luhn | Nov. 4, 1952 |
| 2,710,365 | MacDougall et al. | June 7, 1955 |

FOREIGN PATENTS

| | | |
|---|---|---|
| 726,920 | Germany | Oct. 26, 1942 |